US 6,949,833 B2

(12) United States Patent
O'Kane et al.

(10) Patent No.: US 6,949,833 B2
(45) Date of Patent: Sep. 27, 2005

(54) COMBINED ATOMIC LAYER DEPOSITION AND DAMASCENE PROCESSING FOR DEFINITION OF NARROW TRENCHES

(75) Inventors: William Jude O'Kane, Derry (IE); Robert William Lamberton, Derry (IE)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/273,195

(22) Filed: Oct. 17, 2002

(65) Prior Publication Data

US 2004/0026784 A1 Feb. 12, 2004

(51) Int. Cl.[7] .......................... H01L 23/48; H01L 23/58
(52) U.S. Cl. ...................... 257/773; 257/639; 257/649; 257/760
(58) Field of Search ................... 257/635, 636, 257/639, 640, 649, 758, 760, 773, 510, 513, 618, 622; 438/221, 296, 353

(56) References Cited

U.S. PATENT DOCUMENTS

| | | | |
|---|---|---|---|
| 4,058,430 A | 11/1977 | Suntola et al. | 156/611 |
| 4,102,756 A | 7/1978 | Castellani et al. | 204/43 |
| 4,389,973 A | 6/1983 | Suntola et al. | 118/725 |
| 5,311,055 A | 5/1994 | Goodman et al. | 257/593 |
| 5,582,927 A | 12/1996 | Andricacos et al. | 428/694 |
| 5,851,849 A | 12/1998 | Comizzoli et al. | 438/38 |
| 6,040,243 A * | 3/2000 | Li et al. | 438/687 |
| 6,208,033 B1 * | 3/2001 | Doan et al. | 257/770 |
| 6,323,553 B1 * | 11/2001 | Hsu et al. | 257/751 |
| 6,538,327 B1 | 3/2003 | Lopatin et al. | |
| 6,551,399 B1 | 4/2003 | Sneh et al. | |
| 6,610,568 B2 | 8/2003 | Marsh et al. | |
| 6,664,186 B1 | 12/2003 | Callegari et al. | |
| 6,699,783 B2 | 3/2004 | Raaigmakers et al. | |
| 6,800,552 B2 | 10/2004 | Elers et al. | |
| 6,824,816 B2 | 11/2004 | Aaltonen et al. | |
| 2003/0032281 A1 | 2/2003 | Werkhoven et al. | |

OTHER PUBLICATIONS

CVD Data Storage Bulletin, Dan Woods, R&D Manager and Senior Member Technical Staff, Texas Instruments, "Improved Disk Drives Through the Computational Power of DSP," Sep. 2000, p.p. 15–21.

* cited by examiner

*Primary Examiner*—Hung Vu

(57) ABSTRACT

The invention offers a structure that includes a substrate with a top surface and a bottom surface, an etched dielectric layer having sidewalls and an upper surface, wherein the etched dielectric layer with a thickness of v, is positioned upon a first portion of the top surface of the substrate but not positioned upon a second portion of the top surface of the substrate having a width equal to x, an atomic layer deposited (ALD) film with a thickness of y, positioned upon the upper surface of the etched dielectric layer, the sidewalls of the etched dielectric layer, and the second portion of the top surface of the substrate, and a trench formed by the atomic layer with a width equal to x−2y. The invention also offers a method of forming a structure with a trench that includes the steps of depositing a dielectric layer on a substrate, forming a patterned photoresist on the dielectric layer, forming a space having a width x, by etching the dielectric layer, removing the patterned photoresist to form a gap having sidewalls and a bottom, and depositing an atomic layer with a thickness of y on the etched dielectric layer, and the sidewalls and the bottom of the gap, wherein a trench is formed by the atomic layer deposited on the sidewalls and bottom of the gap.

26 Claims, 5 Drawing Sheets

COMBINED ATOMIC LAYER DEPOSITION AND DAMASCENE PROCESSING FOR DEFINITION OF NARROW TRENCHES

CROSS REFERENCE TO RELATED APPLICATIONS

1. Field of the Invention

This invention relates generally to structures having very narrow trenches, including methods of forming them, and one particular embodiment of the invention relates to magnetic read/write heads with a narrow write head top pole formed within a trench according to a preferred embodiment of the present invention.

2. Background of the Invention

Thin film magnetic read/write heads are used to read information from and write information to magnetic tapes or discs. A writer includes a top pole, a bottom pole, and a gap between the two poles that writes the information to the storage medium. In order to write a maximum density of information onto the storage medium, the written media track widths need to be reduced. Dimensions of all the components of the writer must be minimized in order for this to be accomplished.

The density of information on storage medium is usually measured by areal density. The areal density of rotating disc drives can be found by multiplying the number of bits along a track by the number of tracks available per storage medium. Currently utilized storage media have areal densities greater than 30 $Gb/in^2$. Research efforts are currently focusing on manufacturing storage media with areal densities greater than 80 $Gb/in^2$. As discussed above, in order to utilize storage media with high areal densities, the size of the writers must be decreased.

One method of decreasing the size of the writers is to decrease the dimensions of the poles. A writer head has both a bottom and a top pole. The bottom pole often functions as a shared pole for the writer and the reader. The top pole functions only as a pole for the writer. Currently, the width of the writer head top pole is limited by the photolithography techniques utilized to form the trench that contains the top pole. The smallest available dimensions of writer head top poles formed by photolithography are dictated in part by the wavelength of light utilized to print. Phase shift techniques can be used to extend this limit. However, it is generally accepted that the current optical lithography limit for the width of a writer head pole is approximately 0.1 $\mu$m.

Therefore, there remains a need for methods of producing trenches with dimensions less than 0.1 $\mu$m, and the trenches produced thereby, and in particular writers with trenches for top poles less than 0.1 $\mu$m in width.

SUMMARY OF THE INVENTION

One embodiment of the invention offers a structure that includes a substrate with a top surface and a bottom surface, an etched dielectric layer having sidewalls and an upper surface, wherein the etched dielectric layer with a thickness of v, is positioned upon a first portion of the top surface of the substrate but not positioned upon a second portion of the top surface of the substrate having a width equal to x, another dielectric film deposited by atomic layer deposition (ALD) with a thickness of y, positioned upon the upper surface of the etched dielectric layer, the sidewalls of the etched dielectric layer, and the second portion of the top surface of the substrate, and a trench formed by the ALD film with a width equal to x–2y.

Another embodiment of the invention offers a method of forming a structure with a trench that includes the steps of depositing a dielectric layer on, a substrate, forming a patterned photoresist on the dielectric layer, forming a space having a width x, by etching the dielectric layer, removing the patterned photoresist to form a gap having sidewalls and a bottom, and depositing a dielectric film by ALD with a thickness of y on the etched dielectric layer, the sidewalls and the bottom of the gap, wherein a trench is formed by the ALD film on the sidewalls and bottom of the gap.

In yet another embodiment of the invention, a structure containing a trench in accordance with the invention is utilized to form a feature within the trench. In one embodiment, the feature within the trench of the invention is a writer head top pole for a magnetic read/write head.

DETAILED DESCRIPTION OF THE INVENTION

One embodiment of the invention offers a structure that includes a substrate having a top surface, an etched dielectric layer having sidewalls, wherein the etched dielectric layer is positioned upon a first portion of the top surface of the substrate and not upon a second portion of the top surface of the substrate having a width, x, an ALD film, that covers the etched dielectric layer, the second portion of the substrate, and the sidewalls of the dielectric layer, with a uniform thickness of y, and a trench, whose sidewalls are formed by the ALD film covering the sidewalls of the etched dielectric layer, and whose bottom is formed by the ALD film covering the second portion of the substrate, wherein the width of the trench is x–2y.

Structures containing trenches of the invention, and/or trenches made using a method of the invention can be utilized in a number of different applications where narrow trenches for use as gaps or for formation of structures therein are desired. One example of such an application includes the formation of a trench for the subsequent formation of a writer head top pole. In one embodiment, a structure containing a trench in accordance with the invention is utilized to form a writer head top pole in a magnetic read/write head.

Figure 1A:
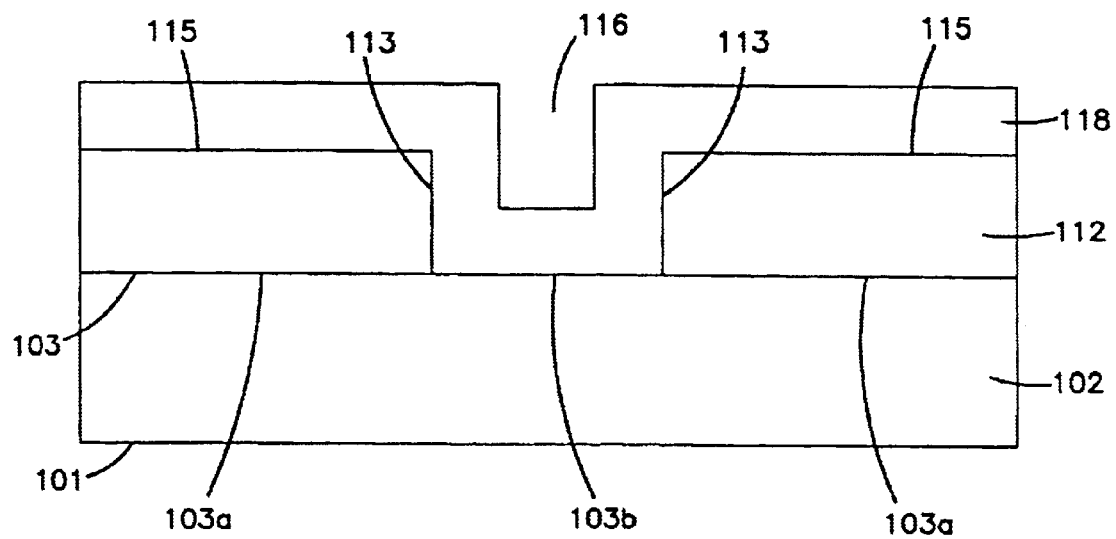
FIG. 1a depicts a cross-sectional view of an example of a structure containing a trench in accordance with one aspect of the invention.
Figure 1B:
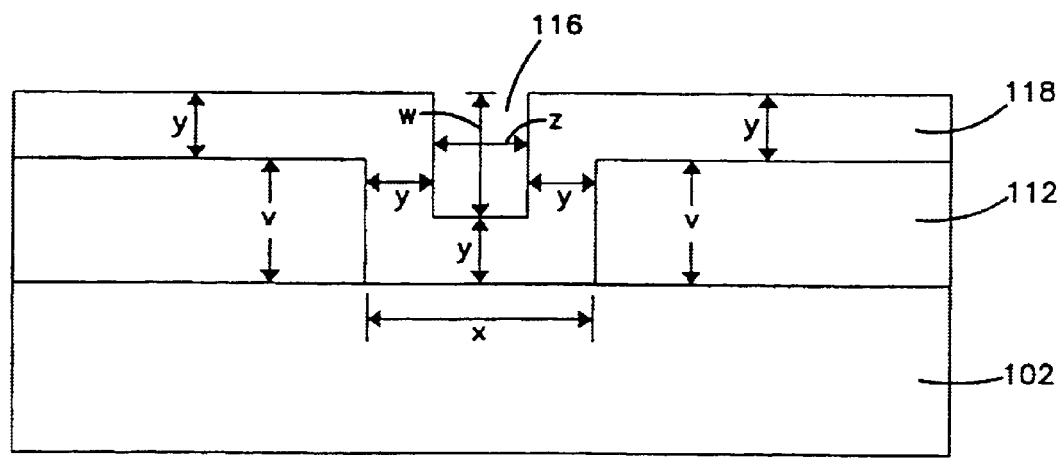
FIG. 1b depicts the structure of FIG. 1a and its corresponding dimensions.

FIGS. 1a and 1b illustrate one embodiment of a structure of the invention. An embodiment of the invention as depicted in FIGS. 1a and 1b could be used in the formation of a writer head top pole of a magnetic read/write head. This embodiment includes a substrate 102, an etched dielectric layer 112, an ALD film 118, and a trench 116.

A structure of the invention includes a substrate 102. The substrate 102 has a top surface 103 and a bottom surface 101. The substrate 102 functions to provide support to the structure during fabrication and also offers a platform on which to fabricate the structure. The substrate 102 can be formed from any material that can function to provide these characteristics. Any material known to those of ordinary skill in the art as one that provides these characteristics can be utilized to form the substrate 102, including but not limited to silicon (SI), and an electrically conducting ceramic material made primarily from $Al_2O_3$ and TiC, referred to herein as "AlTiC". In one embodiment, the substrate 102 is made of AlTiC. Generally, the substrate 102 has a thickness between about 1100 µm and about 1200 µm, and preferably about 1150 µm. In the case of a magnetic recording head the substrate may already have a magnetic read head formed on it prior to definition of the write head definition.

A structure of the invention also includes an etched dielectric layer 112, which functions to insulate the trench 116 or features that are formed within the trench 116. The etched dielectric layer 112 also functions to define, at least in part, both the width and the depth of the trench 116. The etched dielectric layer 112 functions to define, in part, the width of the trench 116 by defining the width "x".

The etched dielectric layer 112 has sidewalls 113, and an upper surface 115, as depicted in FIG. 1a. The etched dielectric layer 112 is positioned upon a first portion 103a of the top surface 103 of the substrate 102. The etched dielectric layer 112 is not positioned upon a second portion 103b of the top surface 103 of the substrate 102. The distance of the second portion 103b along the top surface 103 of the substrate 102 is defined by the value x.

Generally, x is small so that the trench 116 has a narrow width. Generally, in embodiments of the invention where the trench 116 is utilized to form a writer head top pole, x is between about 0.08 µm and about 0.15 µm, preferably x is between about 0.1 µm and about 0.15 µm The etched dielectric layer 112 has a thickness of "v". The thickness, v, defines, at least in part, the depth, w, of the trench 116. Generally, in embodiments of the invention where the trench 116 is utilized to form a writer head top pole, v is between about 0.05 µm and about 0.4 µm, preferably between about 0.1 µm and about 0.2 µm.

The etched dielectric layer 112 can be formed of any dielectric material. Generally, a dielectric material is one that does not conduct electricity readily, i.e., is an insulator. In one embodiment, the dielectric material that makes up the etched dielectric layer 112 also resists breakdown under high voltages, has reasonable physical stability, and has characteristics that do no vary significantly over a fairly wide temperature range. Any dielectric material known to those of ordinary skill in the art can be utilized for the etched dielectric layer 112, including but not limited to silicon dioxide ($SiO_2$), aluminum oxide ($Al_2O_3$), and silicon oxynitride ($SiO_xN_y$). In one embodiment, the etched dielectric layer 112 is made of aluminum oxide.

A structure of the invention also includes an atomic layer deposited (ALD) film 118, which also functions to insulate the trench 116 or the feature formed within the trench 116. The ALD film 118 functions generally to further reduce the size of the trench 116. The ALD film 118 also further defines the dimensions of the trench 116 by defining the value "y". The value y is equal to the thickness of the ALD film 118.

The ALD film 118 is positioned upon the upper surface 115 of the etched dielectric layer 112, the second portion 103b of the top surface of the substrate 102, and on the sidewalls 113 of the etched dielectric layer 112. The ALD film 118 covers all of these surfaces with a uniform thickness, y.

The ALD film 118 is made up of at least one monolayer of a molecule. In embodiments where the ALD film 118 includes more than one monolayer of a molecule, the second and succeeding layers of molecules are deposited over the first monolayer. The manner of deposition makes the ALD film 118 uniform to the atomic level. The ALD film 118 also has 100% coverage, even on the sidewalls 113 of the etched dielectric layer 112. The 100% coverage and uniform thickness is maintained even on very high aspect ratio features (the aspect ratio of a feature is the ratio of the height to the width). These characteristics of the ALD film 118 are also referred to as conformal.

Generally, in embodiments of the invention where the trench 116 is utilized to form a writer head top pole, y is between about 0.005 µm and about 0.03 µm. The ALD film 118 can be made of any material that functions as a dielectric and can be deposited in a single layer atomic fashion by the process referred to as atomic layer deposition (ALD) (also referred to as atomic layer chemical vapor deposition (ALCVD)). Materials deposited by ALD are formed from a chemical reaction of two precursor atoms or molecules that are deposited on a surface. Any material that is known to those of ordinary skill in the art as one that can function as a dielectric and is capable of being deposited by ALD can make up the ALD film 118. Examples of such materials and their precursors include but are not limited to aluminum oxide, $Al_2O_3$ (precursors $Al(CH_3)_3$ and $H_2O$), zinc sulfate, ZnS (diethylzinc (DEZn) and $H_2S$), hafnium oxide, HfO (Hf metal vapor and $H_2O$), zirconium oxide, ZrO ($ZrCl_4$ and $H_2O$). In one embodiment of the invention, ALD film 118 is formed by deposition of $Al_2O_3$, using $Al(CH_3)_3$ and $H_2O$ as precursors.

The trench 116 that is formed according to a preferred embodiment of the present invention can function as a gap in the final structure, or alternatively, the trench 116 can be utilized to form a feature within the trench 116. In one embodiment, the trench 116 is utilized to form a feature within the trench 116. In another embodiment, the feature that is formed within the trench 116 is a writer head top pole for a magnetic read/write head. The trench 116 is generally formed by the ALD film 118. The trench 116 has sidewalls that are formed by the ALD film 118 covering the sidewalls 113 of the etched dielectric layer 112, and whose bottom is formed by the ALD film 118 covering the second portion 103b of the top surface 103 of the substrate 102. As the ALD film 118 is deposited on the etched dielectric layer 112, it uniformly covers the entire exposed surface. This includes the etched dielectric layer 112, the sidewalls 113 of the etched dielectric layer 112 and the second portion 103b of the top surface 103 of the substrate 102.

The conformal nature of the ALD film 118 leads to the width, z, of the trench 116 being defined both by the width, x, of the second portion 103b of the top surface 103 of the substrate 102 and the thickness, y, of the ALD film 118. Therefore, the width, z, of the trench 116 is equal to x−2y. In one embodiment of the invention, the width of the trench, z is between about 0.02 µm and about 0.14 µm, preferably between about 0.04 µm and about 0.1 µm.

The depth, w, of the trench 116 is defined both by the thickness, v, of the etched dielectric layer 112 and the thickness, y, of the ALD film 118. Therefore, the depth, w, of the trench 116 is (v+y)−y, or simply v, the thickness of the etched dielectric layer 112. In one embodiment of the invention, the depth of the trench, w is between about 0.05 µm and about 0.4 µm, preferably between about 0.1 µm and about 0.2 µm.

A trench 116 of the invention also has an aspect ratio. The aspect ratio of a trench 116 is the ratio of the depth, w, of the trench 116 to the width, z, of the trench 116. A trench 116 formed in accordance with the invention generally has an aspect ratio between about 2.5:1 and about 20:1. In a preferred embodiment of the invention, a trench 116 in accordance with the invention has an aspect ratio between about 2.5:1 and about 5:1.

As seen by the relationship of the dimensions of various aspects of the structure, the dimensions of the trench 116 can be manipulated by modifying the thickness, y, of the ALD film 118, the thickness, v, of the etched dielectric layer 112, and the width, x, of the second portion 103b. Generally, the thickness, y, of the ALD film 118 is small, relative to the thickness, v, of the etched dielectric layer 112, and the width, x, of the second portion 103b. Because of this relative difference in dimensions, in one embodiment, y is modified to make small changes in the width, z, and depth, w, of the trench 116, and x and v are modified to make larger changes in the width, z, and depth, w, of the trench 116 respectively.

A structure according to one embodiment of the invention can be fabricated and integrated into magnetic recording heads in any way commonly known and used by those of ordinary skill in the art. One way of integrating a trench 116 to be used as a writer head top pole into a magnetic recording head is to integrate the fabrication thereof into the wafer build stage of the magnetic recording head. Preferably, the fabrication of a trench 116 to be used as a writer head top pole in accordance with the invention is integrated into a magnetic recording head after the magnetic reader is defined. In one embodiment, a CMP planarization step before commencing writer head formation. The following method of fabricating a trench 116 in accordance with the invention is one example of a method that can be integrated into fabrication of a magnetic recording head in this fashion.

An example of a method of fabricating a structure of the invention is illustrated in FIGS. 2 through 7, and will be discussed with reference thereto below.

Figure 2:
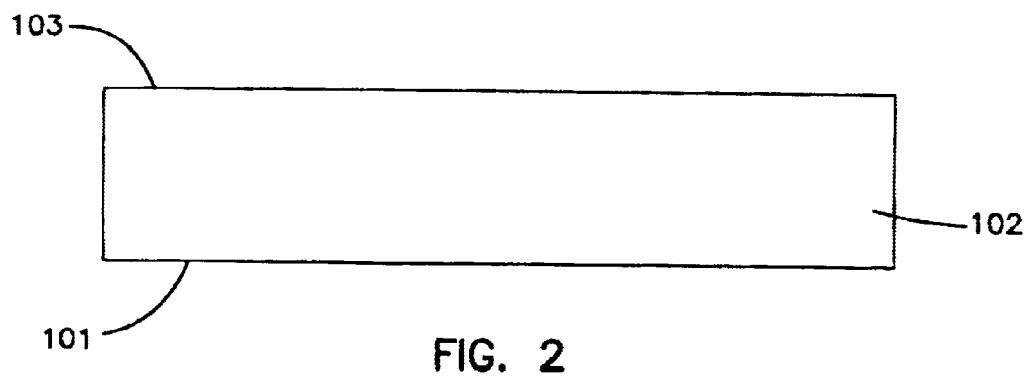
FIGS. 2 through 7 depict a structure containing a trench in accordance with the invention after various steps in the fabrication thereof.

A structure in accordance with one embodiment of the invention after the first step in a fabrication method is illustrated in FIG. 2. The first step is to form the substrate 102. The substrate 102 can be formed by any method known to those of ordinary skill in the art including but not limited to ceramic pressing. In one embodiment of the invention, substrate 102 is formed by ceramic pressing AlTiC to a thickness of about 1150 μm. In another embodiment, the substrate 102 includes a magnetic read head previously fabricated thereon.

Figure 3:
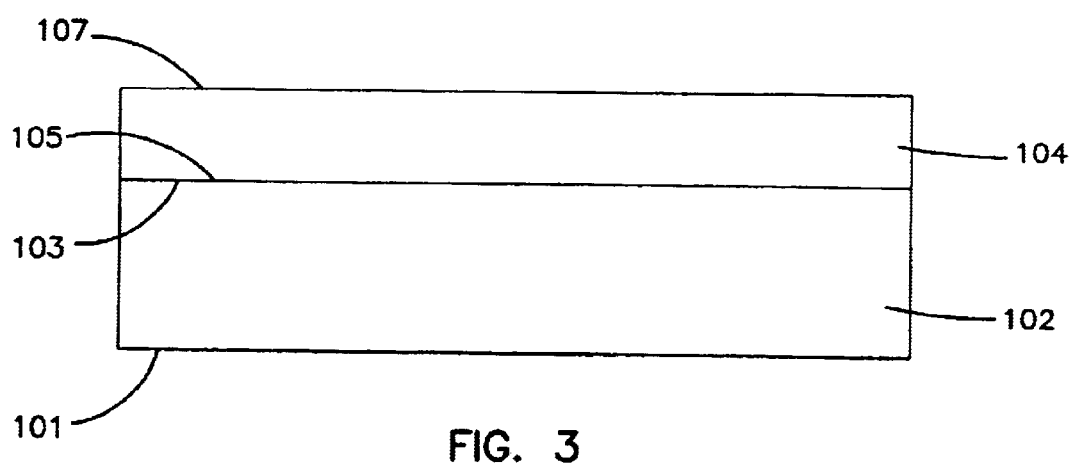

A structure in accordance with the invention after the next step, formation of a dielectric layer 104 is depicted in FIG. 3. The dielectric layer 104 is deposited on the top surface 103 of the substrate 102 so that the bottom surface 105 of the dielectric layer 104 is in physical contact with the top surface 103 of the substrate 102. The top surface 107 of the dielectric layer 104 is opposite the bottom surface 105. The dielectric layer 104 can be deposited by any method known to those of ordinary skill in the art, including but not limited to plasma enhanced chemical vapor deposition (PECVD), physical vapor deposition (PVD), or thermal oxidation. Preferably, the dielectric layer 104 is deposited by PECVD.

Figure 4:
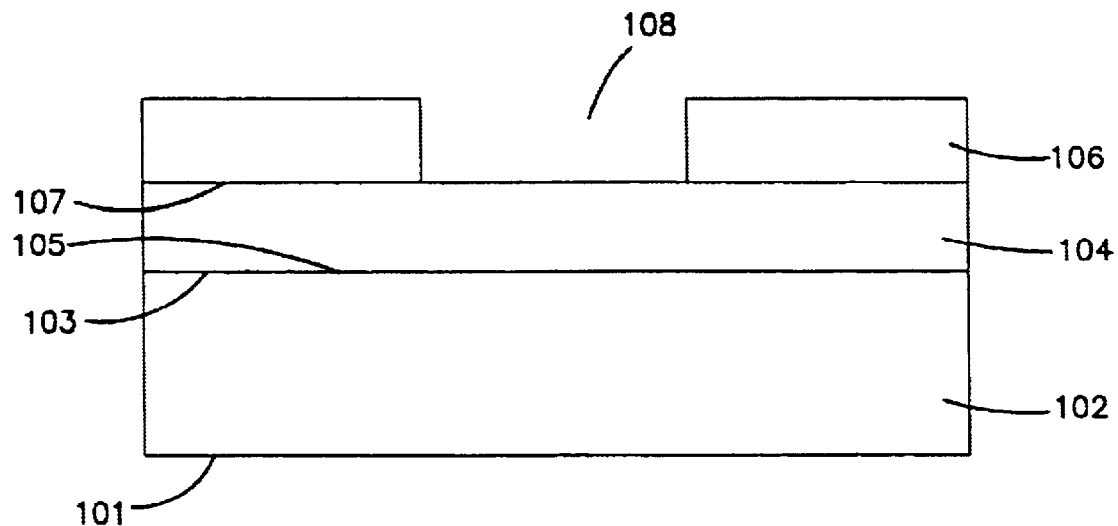

A structure in accordance with the invention after the next step, formation of a photoresist layer 106 and space 108 is illustrated in FIG. 4. Various methods for formation of the photoresist layer 106 and the space 108 are well known to those of ordinary skill in the art, and any such method can be utilized. A general description of one such process is given below.

First, the dielectric layer 104 is coated with a thin layer of photoresist. Photoresist is a polymeric mixture that can be either positive or negative. The photoresist is irradiated through a mask, which in the case of positive photoresist is an exact copy of the desired photoresist layer 106 and the space 108. Irradiation with light in the near ultraviolet region of the spectrum modifies the chemical properties of the polymeric mixture and in the case of "positive" photoresist, makes it more soluble to certain developers. The next step then removes the exposed photoresist polymer through use of a suitable developer to give the resulting photoresist layer 106 and the space 108.

Figure 5:
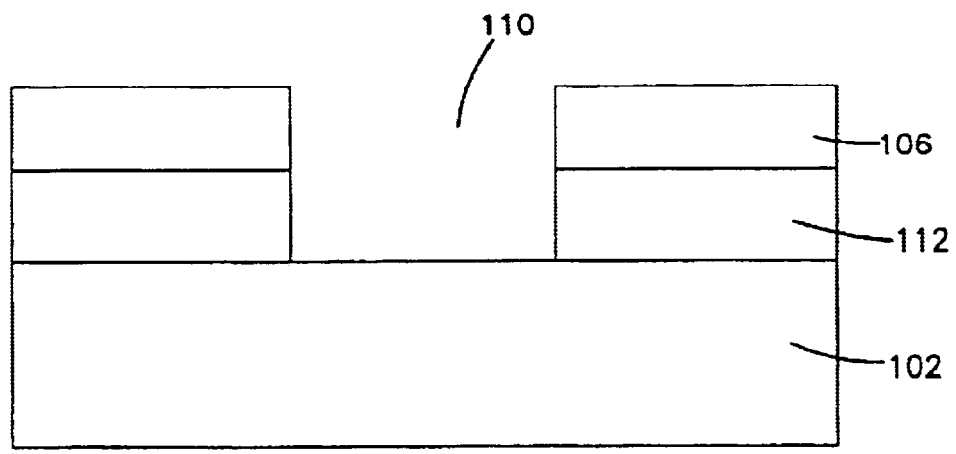

A structure after the next step in a method of fabrication, etching of a gap 110 is illustrated in FIG. 5. After the photoresist layer 106 and the space 108 have been formed, the structure thereof is used to form the gap 110 through the use of etching. The dielectric layer 104 is etched below the space 108 to form the gap 110. This step also forms the etched dielectric layer 112. Any method of etching known to and commonly used by those of ordinary skill in the art can be utilized. Examples of methods include, but are not limited to, reactive ion etching (RIE), and physical ion beam etching. Preferably, the etching is accomplished through use of RIE using an inductively coupled plasma (ICP) process with fluorine based chemistry. Preferably, the substrate 102 functions as an etch stop layer that defines how far the etching process progresses into the device.

Figure 6:
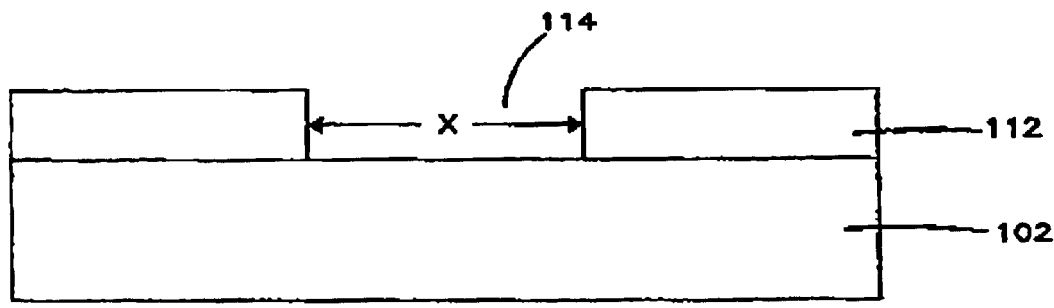

A structure after the next step in a method of fabrication, removal of the photoresist layer 106 is illustrated in FIG. 6. Any method of stripping the photoresist layer 106 known to and commonly used by those of ordinary skill in the art can be utilized. Examples of methods include both wet and dry stripping methods, and include but are not limited to stripping with acetone. In one embodiment, the photoresist layer 106 is stripped with acetone. Removal of the photoresist layer 106 forms the width gap 114, with a width of "x".

Figure 7A:
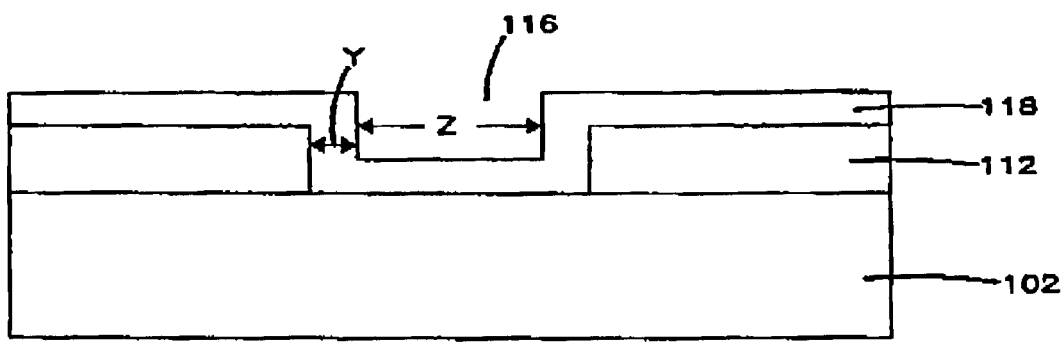

A structure after the final step in fabrication, deposition of the ALD film 118 is illustrated in FIG. 7a. The ALD film 118 is deposited by atomic layer deposition (ALD). Generally, ALD is a process which deposits one molecule thick layers of a molecule or compound. ALD is accomplished by pulsing a first reactant gas into a deposition chamber containing the surface to be covered. This first reactant gas, called a precursor, is absorbed on the surface to be covered, and forms a monolayer. The deposition chamber is then purged with an inert gas, such as argon. The inert gas purging is followed by a pulse of a second reactant gas, also called a precursor. The second reactant gas reacts with the absorbed first reactant gas to form an ultimate molecule or compound on the surface. The first and second reactant gases are chosen to yield the desired molecule or compound on the surface.

In one embodiment, the ALD film 118 is made of $Al_2O_3$. In one embodiment, the precursor gases for the deposition of $Al_2O_3$ are $Al(CH_3)_3$ and $H_2O$. One method of atomic layer deposition of $Al_2O_3$ begins by pulsing $Al(CH_3)_3$ into the deposition chamber and allowing the $Al(CH_3)_3$ to chemisorb onto the surface. Then the deposition chamber is purged with argon. Next, $H_2O$ is pulsed into the deposition chamber. Generally, pulse times are less than about 0.5 seconds and purge times are less than about 2 seconds. For magnetic recording applications the substrate temperature must be kept below 300° C. during deposition. At a substrate temperature of 200° C., ALD alumina deposition rates are approximately 1 Å per cycle.

The thickness of the ALD film 118 is dictated by the individual layers that are formed. Formation of each layer requires pulsing of both precursor gasses with the intervening inert gasses. Generally speaking, currently available ALD methods have growth rates of up to about 20 Å/min.

Once the ALD film 118 is formed, the trench 116 is also formed. Depending on the application, the trench 116 can function as a gap in the structure or can be used to form a feature within the trench 116. The further processing steps for formation of features within the trench 116 vary depending on the feature to be produced. Such processes are well within the skills of one of ordinary skill in the art.

Figure 7B:
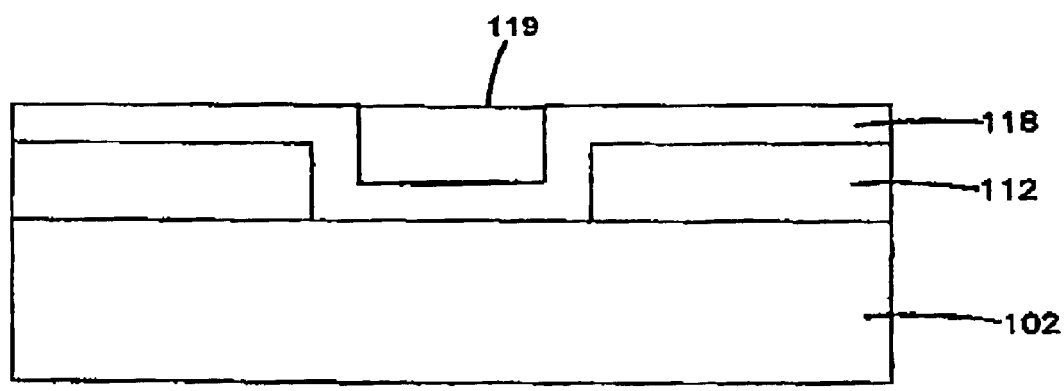
Figure 8:
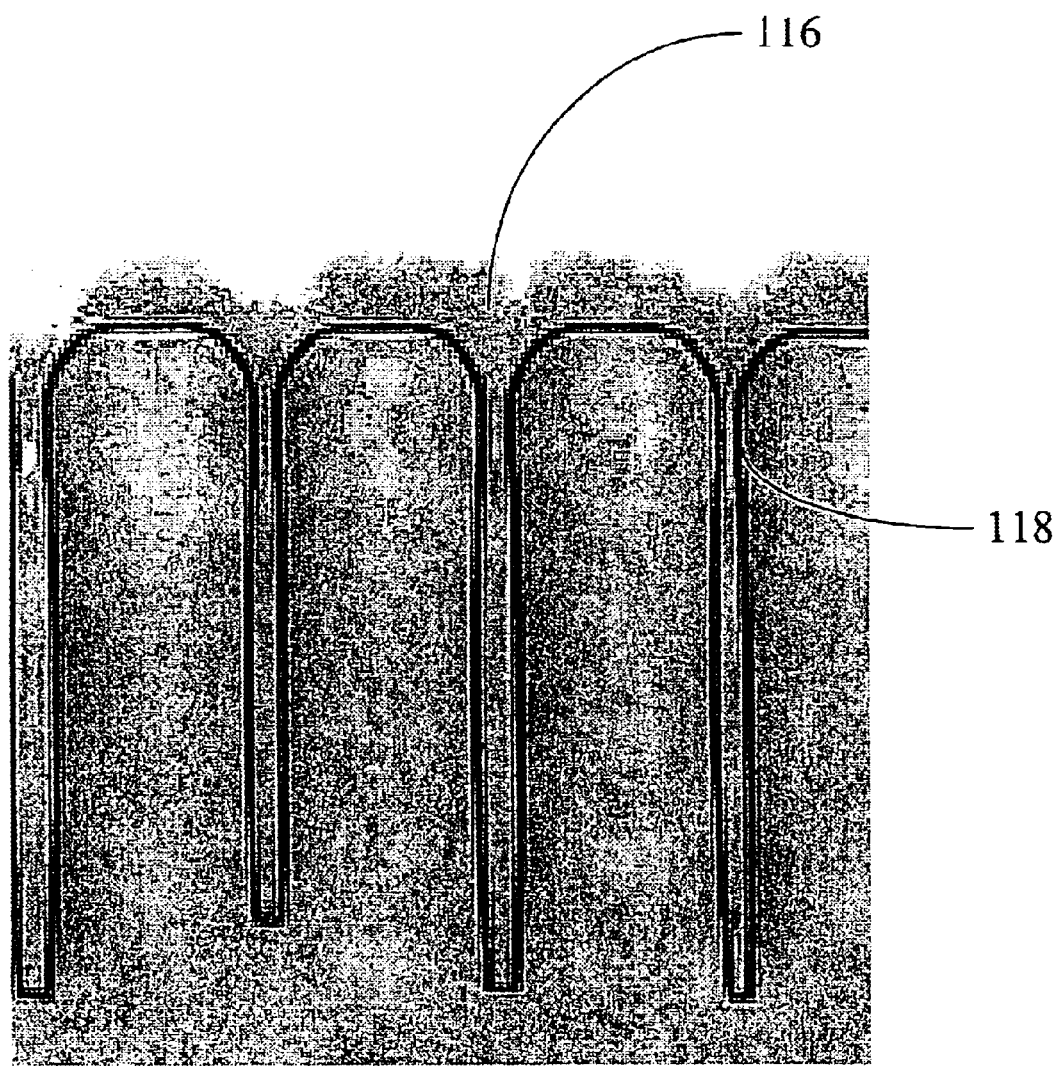
FIG. 8 is depicts an electron microscope (TEM) image showing a trench in accordance with the invention.

An example of a process that could be used to form a writer head top pole within the trench 116 includes electroplating or PVD sputtering of a high moment magnetic material such as CoNiFe, in the case of the latter a CMP planarization step will also be required. This is shown in FIG. 7b, wherein the trench is filled in to create writer head top pole 119.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A magnetic head comprising:
   (a) a substrate comprising a top surface having a first and a second portion;
   (b) an etched dielectric layer comprising sidewalls and an upper surface, wherein said etched dielectric layer is positioned upon said first portion of said top surface of said substrate but not positioned upon said second portion of said top surface of said substrate, wherein said etched dielectric layer has a thickness equal to v, and wherein said second portion of said top surface of said substrate has a width equal to x;
   (c) at least one monolayer, wherein said at least one monolayer is positioned upon said upper surface of said etched dielectric layer, said sidewalls of said etched dielectric layer, and said second portion of said top surface of said substrate, and said at least one monolayer has a thickness of y;
   (d) a trench, wherein said trench is formed by said at least one monolayer, and said trench has a width equal to x−2y; and
   (e) a magnetic write pole positioned within the trench.

2. The magnetic head of claim 1, wherein said substrate is chosen from the group consisting of AlTiC and silicon.

3. The magnetic head of claim 1, wherein said substrate has a thickness of between about 1100 μm and about 1200 μm.

4. The magnetic head of claim 3, wherein said substrate has a thickness of about 1150 μm.

5. The magnetic head of claim 1, wherein said etched dielectric layer comprises silicon dioxide, aluminum oxide and or silicon oxynitride.

6. The magnetic head of claim 1, wherein v is equal to about 0.05 μm to about 0.4 μm.

7. The magnetic head of claim 6, wherein v is equal to about 0.1 μm to about 0.2 μm.

8. The magnetic head of claim 1, wherein x is equal to about 0.08 μm to about 0.15 μm.

9. The magnetic head of claim 8, wherein x is equal to about 0.1 μm to about 0.15 μm.

10. The magnetic head of claim 1, wherein said at least one monolayer comprises aluminum oxide, silicon dioxide, hafniorn oxide, or zirconium oxide.

11. The magnetic head of claim 10, wherein said at least one monolayer comprises aluminum oxide.

12. The magnetic head of claim 1, wherein y is equal to about 0.005 μm to about 0.03 μm.

13. The magnetic head of claim 1, wherein said trench further comprises sidewalls and a bottom.

14. The magnetic head of claim 13, wherein said sidewalls of said trench are formed by said at least one monolayer covering the sidewalls of said etched dielectric layer, and wherein said bottom of said trench is formed by said at least one monolayer covering the second portion of said top surface of said substrate.

15. The magnetic head of claim 1, wherein x−2y equal about 0.02 μm to about 0.14 μm.

16. The magnetic head of claim 1, wherein said trench has a depth equal to said thickness, v, of said etched dielectric layer.

17. A magnetic head comprising:
   (a) a first layer comprising a top surface having a first and a second portion;
   (b) a second layer comprising sidewalls and an upper surface, wherein said second layer is positioned upon said first portion of said top surface of said first layer but not positioned upon said second portion of said top surface of said first layer;
   (c) at least one monolayer, wherein said at least one monolayer is positioned upon said upper surface of said second layer, said sidewalls of said second layer, and said second portion of said top surface of said first layer;
   (d) a trench, wherein said trench is formed by said at least one monolayer; and
   (e) a magnetic write pole positioned in the trench.

18. The magnetic head of claim 17, wherein said second layer is an etched dielectric layer, further wherein said etched dielectric layer has a thickness equal to v, and said second portion of said top surface of said first layer has a width equal to x.

19. The magnetic head of claim 18, wherein said at least one monolayer has a thickness of y.

20. The magnetic head of claim 19, wherein said trench has a width substantially equal to x−2y.

21. The magnetic head of claim 18, wherein v is equal to about 0.05 μm to about 0.4 μm.

22. The magnetic head of claim 18, wherein v is equal to about 0.1 μm to about 0.2 μm.

23. The magnetic head of claim 17, wherein said first layer is a substrate and said substrate is chosen from the group consisting of AlTiC and silicon.

24. The magnetic head of claim 23, wherein said substrate has a thickness of about 1150 μm.

25. The magnetic head of claim 17, wherein said first layer has a thickness of about 1100 μm to about 1200 μm.

26. The magnetic head of claim 17, wherein said second layer is an etched dielectric layer and said etched dielectric layer comprises silicon dioxide, aluminum oxide or silicon oxynitride.

* * * * *